US007664560B2

(12) United States Patent
Lai et al.

(10) Patent No.: US 7,664,560 B2
(45) Date of Patent: Feb. 16, 2010

(54) PORTABLE MEDIA PLAYER WITH COMMON EARPHONE TRANSMISSION PORT AND SIGNAL ADAPTOR CABLE THEREOF

(75) Inventors: Cheng-Shing Lai, Taipei (TW); Zheng-Rong Zou, Nanking (CN)

(73) Assignee: Inventec Appliances Corp., Taipei (TW)

( * ) Notice: Subject to any disclaimer, the term of this patent is extended or adjusted under 35 U.S.C. 154(b) by 553 days.

(21) Appl. No.: 11/511,230

(22) Filed: Aug. 29, 2006

(65) Prior Publication Data

US 2007/0047745 A1 Mar. 1, 2007

(30) Foreign Application Priority Data

Aug. 31, 2005 (TW) ............................. 94129862 A

(51) Int. Cl.
*G06F 17/00* (2006.01)

(52) U.S. Cl. ........................................................ 700/94

(58) Field of Classification Search ................... 700/94; 704/500; 439/502; 320/115, 163
See application file for complete search history.

(56) References Cited

U.S. PATENT DOCUMENTS

| | | | | |
|---|---|---|---|---|
| 6,065,075 | A * | 5/2000 | Ryzin et al. | 710/65 |
| 6,109,797 | A * | 8/2000 | Nagura et al. | 385/88 |
| 6,211,649 | B1 * | 4/2001 | Matsuda | 320/115 |
| 7,103,381 | B1 * | 9/2006 | Wright et al. | 455/557 |
| 7,106,541 | B2 * | 9/2006 | Bruner et al. | 360/75 |
| 7,184,794 | B2 * | 2/2007 | Hess et al. | 455/559 |
| 7,298,765 | B2 * | 11/2007 | Ganton et al. | 370/537 |
| 7,315,764 | B1 * | 1/2008 | Sutardja et al. | 700/94 |
| 2003/0148797 | A1 * | 8/2003 | Huang | 455/573 |
| 2005/0070153 | A1 * | 3/2005 | Tang | 439/502 |
| 2006/0009984 | A1 * | 1/2006 | Lim | 704/500 |
| 2006/0161281 | A1 * | 7/2006 | Lian et al. | 700/94 |

* cited by examiner

*Primary Examiner*—Andrew C Flanders
(74) *Attorney, Agent, or Firm*—Bacon & Thomas, PLLC

(57) ABSTRACT

A portable media player comprises an earphone transmission port, a detection circuit, a switch circuit, and a processor. The earphone transmission port mounted on the portable media player is electrically connected to a connector for receiving a signal or power transmitted from the connector. The detection circuit electrically connected to the earphone transmission port is used to detect a type of the connector for sending an informing signal. The switch circuit electrically connected to the earphone transmission port is used to switch between a signal inputting status and a signal outputting status according to the type of the connector. The processor electrically connected to the detection circuit and the switch circuit is used to receive the informing signal for turning on or off the switch circuit.

8 Claims, 4 Drawing Sheets

PORTABLE MEDIA PLAYER WITH COMMON EARPHONE TRANSMISSION PORT AND SIGNAL ADAPTOR CABLE THEREOF

FIELD OF THE INVENTION

The present invention relates to a portable media player and a signal adaptor cable thereof and more particularly to a portable media player with an earphone transmission port electrically connecting to a signal adaptor cable.

BACKGROUND OF THE INVENTION

With the daily advances of the electronics industry, we are facing an information era. A multitude of high-tech electronic products are derived from various digital technologies and improved very fast while various electronic components and peripherals for assembly in electronic products are also developed and improved. Electronic components and peripherals are applied to daily life or working space of various industries so as to substantially improve human life with technology development. However, following the development of various electronic technologies, consumers always pay attention to utility and convenience, and if the related electronic products can satisfy their needs.

Traditional MP3 players are generally applied to daily life as requisite electronic tools. Traditional MP3 player functions includes music playing and broadcasting, and now the traditional MP3 player can be used as a portable disk and/or a portable recorder for downloading and recording. According to the obvious and strong need for integrating all functions in a single unit, manufacturers must design novel MP3 players which are more convenient to carry and easier to play for satisfying consumers' needs. Meanwhile, MP3 players or other electronic products should be designed to be more compact by minimizing various electronic elements and peripherals of the electronic products to a compact profile for the purpose of increasing the utility and reducing the occupied space thereof.

Presently, MP3 players have integrated with portable disks and portable recorders to provide various functions, such as downloading, recording, or storing. Meanwhile, each of the MP3 players usually has three types of input/output connectors, including a USB connector for electrically connecting to a computer device, an earphone connector for electrically connecting to an earphone, and a microphone connector for electrically connecting to a microphone. However, if one manufacturer wants to design the MP3 player more compact, the MP3 player should not include too many connectors due to the limited surface area of an MP3 player.

It is therefore tried by the inventor to develop a portable media player with a earphone transmission port and a signal adaptor cable thereof to solve the problems existing in conventional MP3 player so that the portable media player can omit unnecessary connectors, and a plurality of connectors can be integrated into a single connector, such as the earphone transmission port, for reducing the volume and manufacture cost of portable media players.

SUMMARY OF THE INVENTION

A primary object of the present invention is to provide a portable media player with a common earphone transmission port, wherein the portable media player is provided with a processor, a detection circuit, and a switch circuit, and the portable media player is capable of connecting to an external connector by the earphone transmission port for electrically connecting to a connector so that the earphone transmission port can receive signals or power transmitted from the connector. The detection circuit is used to generate an informing signal for the processor according to the signals and power from the connector, and then the processor is used to turn on or off according to the type of the connector so that the portable media player can integrate at least two different functions into the earphone transmission port for selectively connecting to one of at least two different connectors with different functions in order to input/output one of at least two different signals for the purpose of reducing the volume and manufacture cost of the portable media player.

A secondary object of the present invention is to provide a portable media player with a common earphone transmission port, wherein the portable media player comprises an input unit, a power unit, a storage unit, and a radio-wave receiver. The radio-wave receiver is electrically connected to the processor and the earphone transmission port respectively, and is used to receive external radio-wave signals. The power unit is used to supply power to the portable media player, the storage unit is used to store information processed by and from the processor, and the input unit is used to transmit a command signal to the processor for selectively switching between a signal inputting status and a signal outputting status of the portable media player.

A third object of the present invention is to provide a portable media player with a common earphone transmission port, wherein the earphone transmission port is provided with a transmission circuit therein, the transmission circuit comprises a power input pin, a first transmission pin, a second transmission pin, and a ground pin. The power input pin is electrically connected to the detection circuit, the first and second transmission pins are used to transmit signals while the first and second transmission pins are electrically connected to the switch circuit respectively so that the processor can transmit signals between the storage unit and an external device by the first and second transmission pins and the switch circuit.

A fourth object of the present invention is to provide a signal adaptor cable of a portable media player with a common earphone transmission port, wherein the signal adaptor cable is provided with a USB connector at a first pin thereof, and a column-shaped connector at a second pin thereof opposite to the first pin. The USB connector is capable of connecting to a host device, and the signal adaptor cable is further provided with a plurality of wires therein. The column-shaped connector is capable of connecting to the earphone transmission port of the portable media player, and the wires are connected between the USB connector and the column-shaped connector so as to allow signal transmission between the portable media player and the host device; in other words, the signal adaptor cable is used to substitute a traditional USB connector for reducing the numbers of traditional transmission ports on the portable media player to save its outer surface space.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
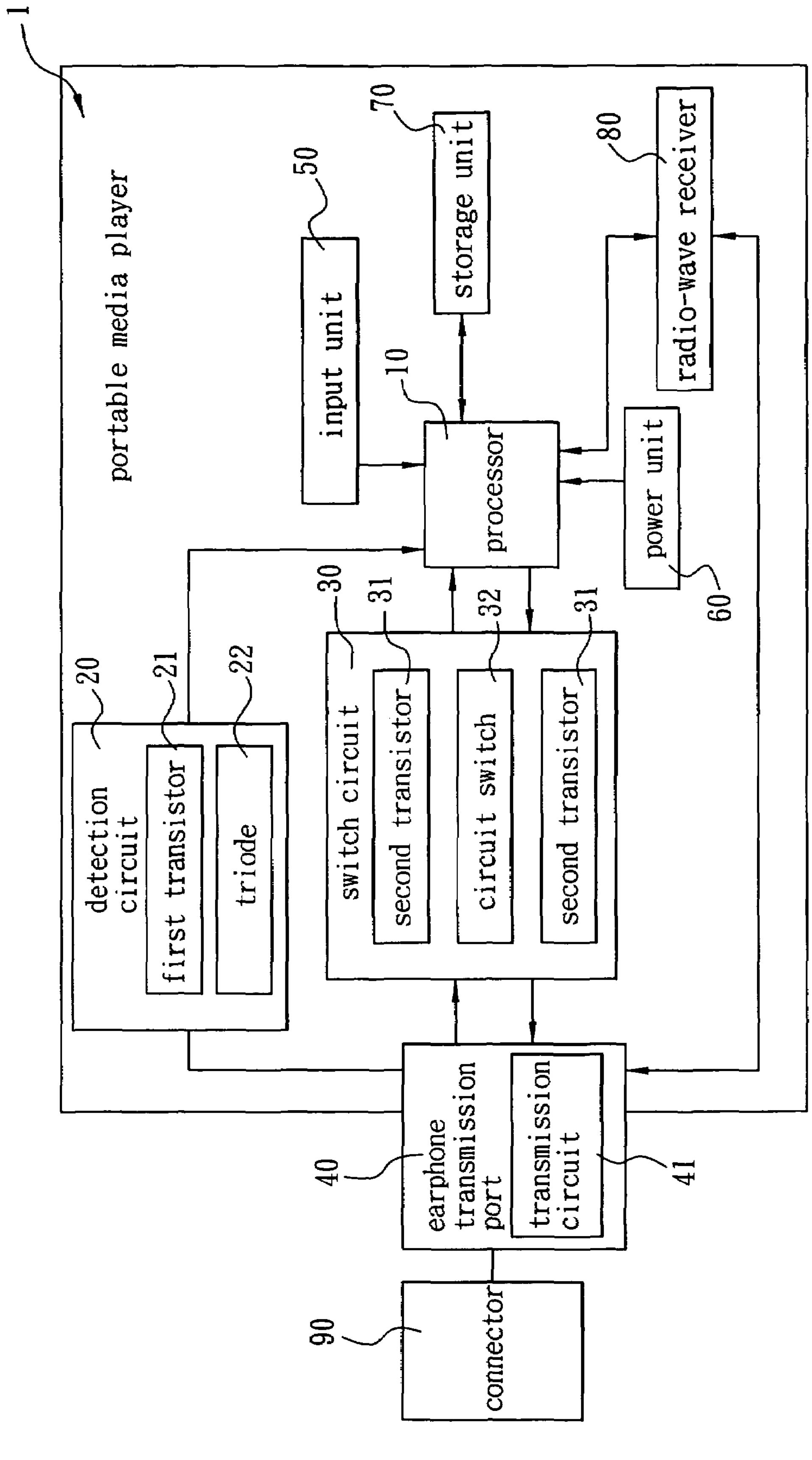
FIG. 1 is a block diagram of a circuit of a portable media player with an earphone transmission port according to a preferred embodiment of the present invention.
Figure 4:
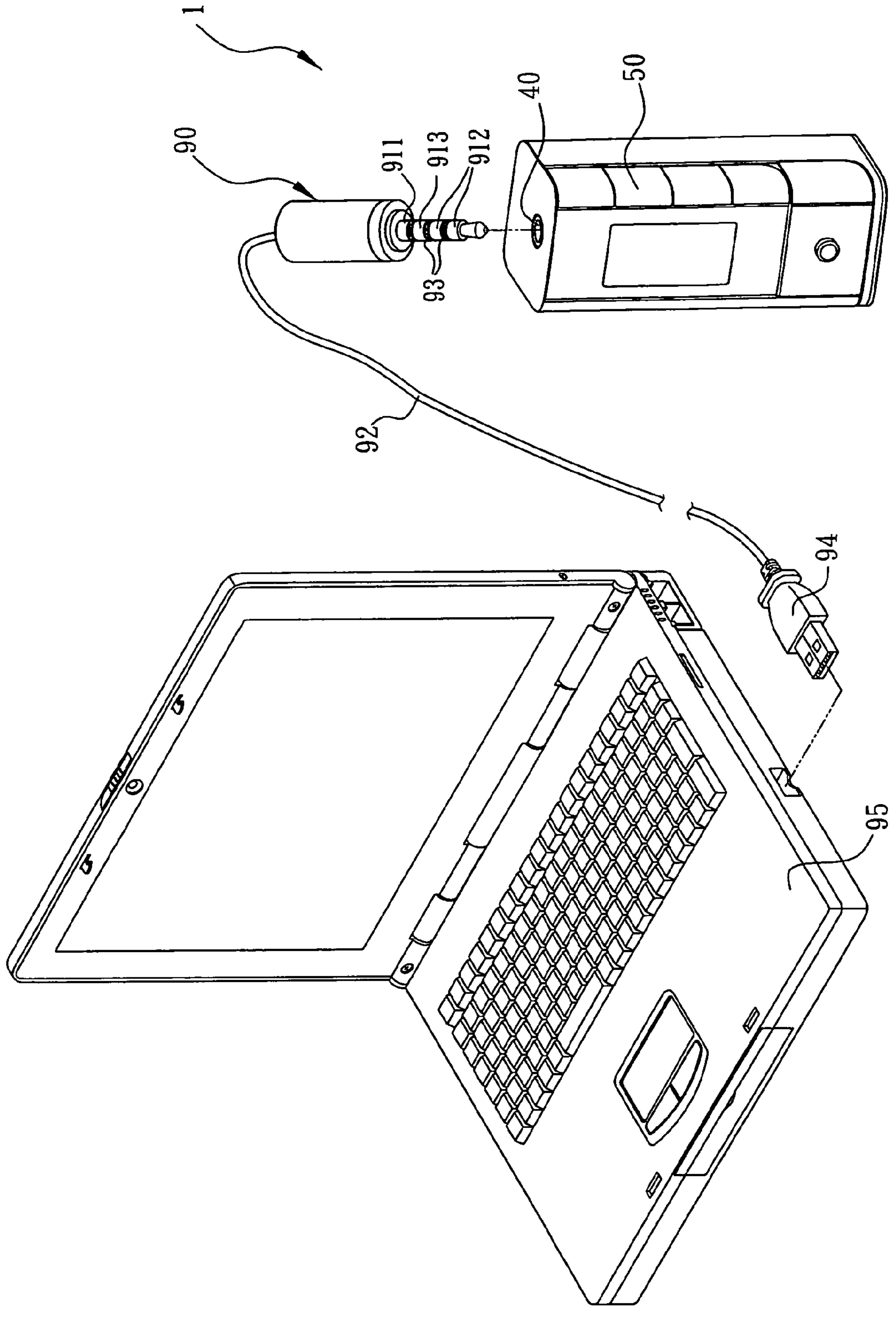
FIG. 4 is a perspective view of the portable media player and the signal adaptor cable according to a preferred embodiment of the present invention in use.

Referring now to FIG. 1, a portable media player with an earphone transmission port according to a preferred embodiment of the present invention is illustrated. As shown, a portable media player 1, such as portable phone, personal digital assistant (PDA), or MP3 player, is provided with a processor 10, a detection circuit 20, a switch circuit 30, and an earphone transmission port 40 therein. The earphone transmission port 40 is mounted on an outer surface of the portable media player 1 which can be selected from a MP3 player provided with a transmission protocol of Universal Serial Bus (USB) (as shown in FIG. 4). The earphone transmission port 40 is electrically connected to the detection circuit 20 and the switch circuit 30 respectively, while the earphone transmission port 40 is used to electrically connect with a connector 90 provided with the USB transmission protocol for receiving at least one signal or power transmitted from the connector 90. The other pin of the detection circuit 20 and the other pin of the switch circuit 30 are electrically connected to a pin of the processor 10, respectively. The detection circuit 20 is used to detect a type of the connector 90 for spinning an informing signal representing the type of the connector to the processor 10 so that the processor 10 can turn on or off the switch circuit 30 according to the type of the connector 90. Especially, the earphone transmission port 40 can be electrically connected to any type of the connector 90 because the earphone transmission port 40 of the portable media player 1 integrates at least two different functions in the same port for the purpose of reducing the volume and manufacture cost of the portable media player 1.

Referring still to FIG. 1, the portable media player 1 of the preferred embodiment of the present invention is further provided with an input unit 50 such as keys, a power unit 60 such as a battery, a storage unit 70 such as a flash memory, and a radio-wave receiver 80 such as frequency modulation (FM) receiver or Digital Audio Broadcasting (DAB) receiver. The radio-wave receiver 80 is electrically connected to the processor 10 and the earphone transmission port 40 respectively, and is used to receive external radio-wave signals. The received radio-wave signals are processed by the processor 10. The power unit 60 is electrically connected to the processor 10 for supply power to the portable media player 1. Storage unit 70 is electrically connected to the processor 10, and used to store information, wherein the information can be processed by and from the processor 10 and then selectively outputted from the earphone transmission port 40 or stored in the storage unit 70. The input unit 50 is electrically connected to the processor 10, and used to transmit a command signal, such as a broadcasting signal, a recording signal, or a playing signal to the processor 10 for selectively switching the portable media player 1 between the signal input status and the signal output status via switch circuit 30.

Figure 2:
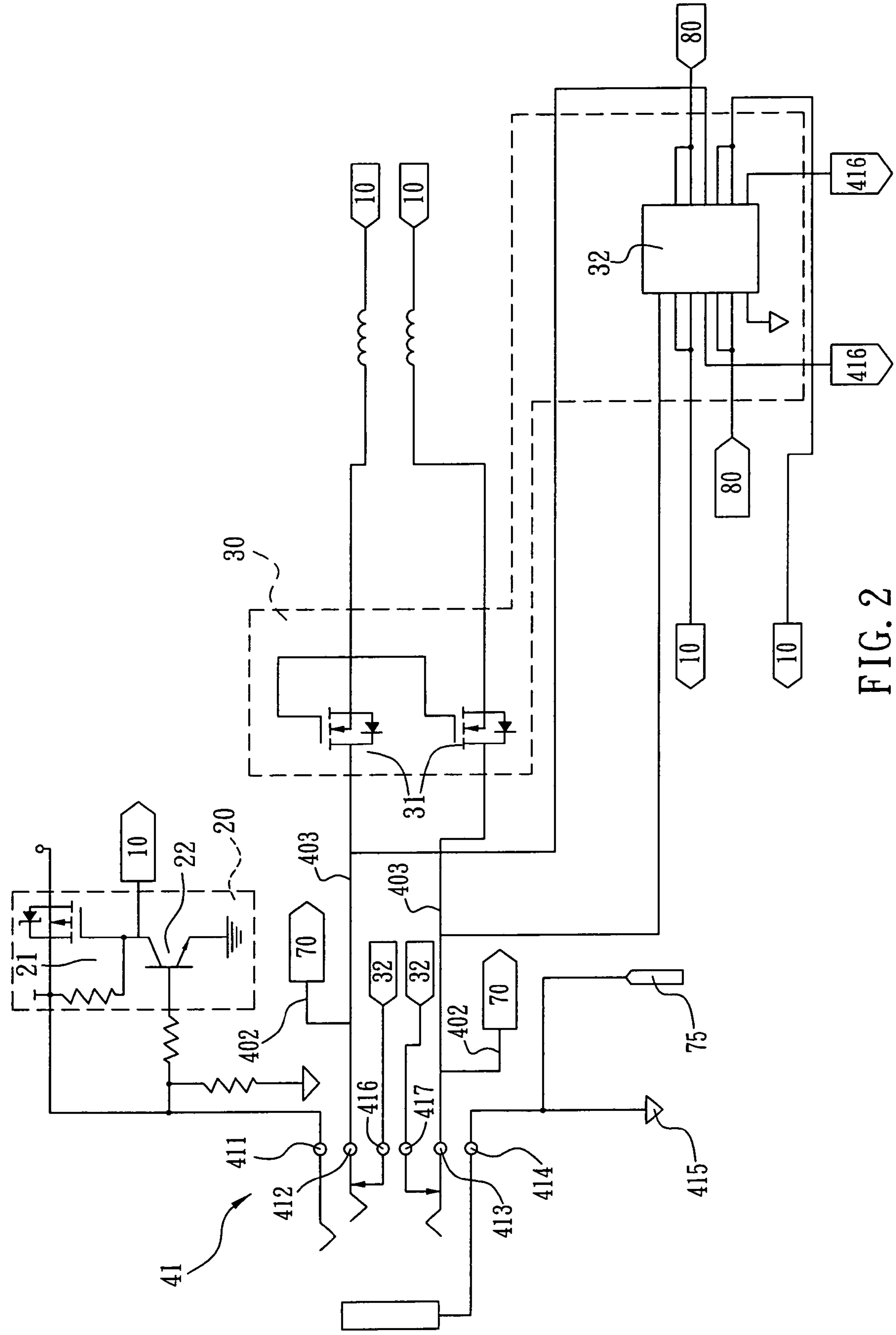
FIG. 2 is a diagram of the circuit of the portable media player with the earphone transmission port according to a preferred embodiment of the present invention.

Referring now to FIGS. 1 and 2, the earphone transmission port 40 of the preferred embodiment of the present invention is provided with a transmission circuit 41 therein. The transmission circuit 41 comprises a power input pin 411 such as USB 5V input, a first transmission pin 412 such as DM(D−), HP_R, or LINE-IN_R, a second transmission pin 413 such as DM(D+), HP_L, or LINE-IN_L, and a ground pin 414, i.e. GND. The power input pin 411 is electrically connected to the detection circuit 20. The first transmission pin 412 and the second transmission pin 413 are used to transmit signals while the first transmission pin 412 and the second transmission pin 413 are electrically connected to the switch circuit 30 respectively so that the processor 10 can transmit signals between the storage unit 70 and an external device (as shown in FIG. 4) by the first transmission pin 412, the second transmission pin 413, and the switch circuit 30. Furthermore, the transmission circuit 41 further comprises a third transmission pin 416 and a fourth transmission pin 417. The third transmission pin 416 is electrically connected to the switch circuit 30 and the first transmission pin 412 while the fourth transmission pin 417 is electrically connected to the switch circuit 30 and the second transmission pin 413. The third transmission pin 416 and the fourth transmission pin 417 are used to receive radio-wave signals transmitted by the radio-wave receiver 80.

Referring still to FIGS. 1 and 2, the ground pin 414 of the preferred embodiment of the present invention is used as an antenna 75 of the radio-wave receiver 80, and is electrically connected to the radio-wave receiver 80. Thus, when the input unit 50 transmits a broadcasting command signal to the radio-wave receiver 80 via the processor 10, the radio-wave receiver 80 starts to receive external radio-wave signals, and the processor 10 simultaneously causes the switch circuit 30 to disables the first transmission pin 412 and the second transmission pin 413 so that the portable media player 1 is selectively switched into the signal outputting status. The radio-wave signals is processed by the processor 10, and then transmitted from the third transmission pin 416 and the fourth transmission pin 417 to the connector 90 via the switch circuit 30. Alternatively, the radio-wave signals may be processed by the processor 10, and then stored in the storage unit 70.

Figure 3:
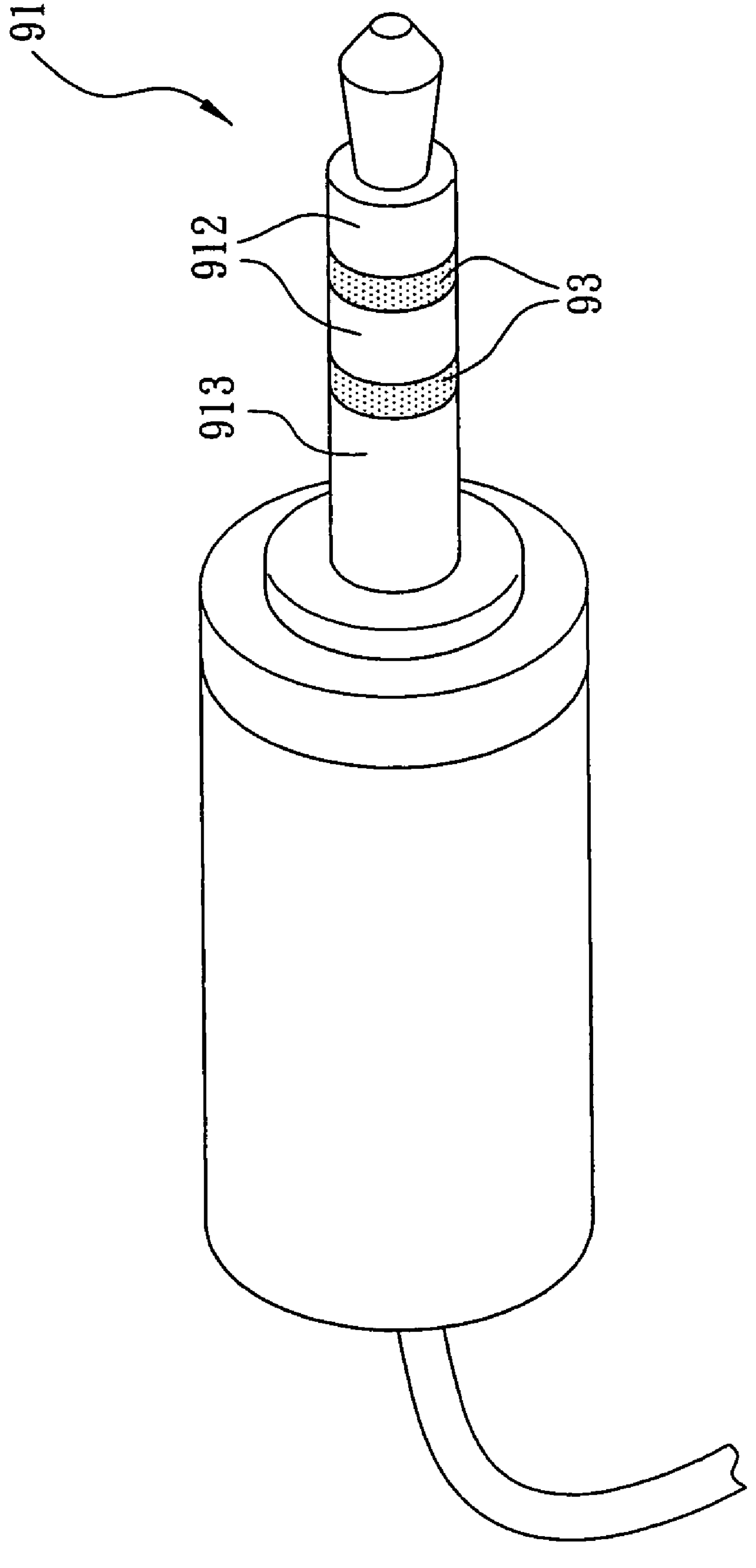
FIG. 3 is an perspective view of a connector of a signal adaptor cable according to a preferred embodiment of the present invention.

Referring still to FIGS. 1 and 2, the detection circuit 20 of the preferred embodiment of the present invention comprises a first transistor 21 (for example, P-channel metal oxide semiconductor field-effect transistor, i.e. P-channel MOSFET, model number: Si2305) and a triode 22 (for example, general purpose transistor, model number: 2sc4617). A pin of the first transistor 21 is electrically connected to the power input pin 411, and the other pin thereof is electrically connected to the triode 22. A pin of the triode 22 is electrically connected to the processor 10. Thereby, the processor 10 can be used to process power signals received by the power input pin 411. Moreover, referring still to FIGS. 1 and 2, the switch circuit 30 of the preferred embodiment of the present invention comprises a pair of second transistors 31 (for example, N-channel MOSFET, model number: Si2312) and a circuit switch 32 (for example, analog switch, model number: SN74LV4066). An pin of the two second transistors 31 are electrically connected to the first transmission pin 412 and the second transmission pin 413 respectively while two ports of the circuit switch 32 are electrically connected to the first transmission pin 412 and the second transmission pin 413 respectively. Furthermore, the other pin of the two second transistors 31 are electrically connected to the processor 10 respectively while another two ports of the circuit switch 32 are electrically connected to the processor 10 respectively. Thereby, the two second transistors 31 and the circuit switch 32 can transmit signals from the first and second transmission pins 412,413 to the processor 10. When the two second transistors 31 are selectively cut off by the processor 10, the portable media player 1 will be switched into the signal inputting status so that the first and second transmission pins 412,413 can input signals to the processor 10. Furthermore, when the circuit switch 32 are selectively cut off by the processor 10, the portable media player 1 will be switched to the signal outputting status so that the first and second transmission pin 412, 413 can output signals to the connector 90. Referring now to FIGS. 2 and 3, when the connector 90 provided with the USB transmission protocol is electrically connected to earphone transmission port 40, the power input pin 411 can be used to receive power (for example, +5V) inputted from a power ring 911 of the connector 90, and then the power (+5V) is transmitted to the triode 22 via the first transistor 21. Thus, the triode 22 of the detection circuit 20 is electrically connected to the processor 10 so that the processor 10 will switch off the switch circuit 30 in turn. Contrarily, when connector 90 provided with the USB transmission protocol is not electrically connected to the earphone transmission port 40, the switch circuit 30 is switched on, wherein the circuit switch 32 is cut off according to a playback signal of the input unit 50 so that the portable media player 1 is switched into the signal outputting status by the switch circuit 30.

Referring still to FIGS. 1, 2 and 3, the first transmission pin 412 of the preferred embodiment of the present invention comprises a first data port 402 and a second data port 403, and the second transmission pin 413 of the preferred embodiment of the present invention also comprises a first data port 402 and a second data port 403. The two first data ports 402 of the first and second transmission pins 412,413 are used to transmit inputted signals while the two second data pins 403 thereof are used to transmit outputted signals. The two first data pins 402 and the two second data pins 403 are electrically connected to the switch circuit 30, respectively. When the connector 90 provided with the USB transmission protocol is not electrically connected to the earphone transmission port 40, the first and second transmission pins 412,413 are electrically connected to a pair of data transmission rings 912 of the connector 90, respectively, and the power input pin 411 is electrically connected to the power transmission ring 911 of the connector 90. The power input pin 411 transmits power inputted from the power transmission ring 911 to the detection circuit 20, and the detection circuit 20 sends an informing signal to the processor 10. When the processor 10 receives the informing signal and switches off the switch circuit 30, the two second data ports 403 will be disabled, and the two first data ports 402 will be used as a transmission channel to transmit data signals.

Referring still to FIGS. 1, 2 and 3, when another connector 90 of output type (such as an earphone connector) which is provided with a left audio channel, a right audio channel, and a ground pin 913 is electrically connected to the earphone transmission port 40 of the preferred embodiment of the present invention, the first and second transmission pins 412, 413 are electrically connected to the left and right audio channels respectively. At the moment, the processor 10 still doesn't receive any informing signal, the switch circuit 30 is turned on, and the switch circuit 30 disables the two first data ports 402 according to a playback signal transmitted from the input unit 50. Even though the portable media player 1 is switched off, the two second data ports 403 can output signals via the first and second transmission pins 412,413. Meanwhile, the power input pin 411 and the ground pin 414 are commonly connected to the ground pin 913 of the connector 90 so that the power input pin 411 and the ground pin 414 form a short circuit, and the power input pin 411 temporarily stops working.

Referring still to FIG. 4, a signal adaptor cable 92 according to another preferred embodiment of the present invention is provided with a USB connector 94 at a first pin thereof, and a column-shaped connector 93 at a second pin thereof opposite to the first pin. USB connector 94 is electrically connected to a host device 95, such as a computer. Column-shaped connector 93 is electrically connected to the earphone transmission port 40 of the portable media player 1 as described above. The signal adaptor cable 92 is further provided with a plurality of wires 96 therein, and each of the wires 96 has an individual function different from each other, such as transmission of power or data signals. The wires are electrically connected between the USB connector 94 and the column-shaped connector 93 so as to allow signal transmission between the portable media player 1 and the host device 95. In other words, the signal adaptor cable 92 is used to substitute a traditional USB adaptor for reducing the numbers of traditional transmission ports on the portable media player 1 to save its outer surface space.

Referring now to FIGS. 2 and 4, the column-shaped connector 93 in another preferred embodiment of the present invention is provided with a plurality of transmission rings on its outer peripheral surface, and each of the wires 96 in the signal adaptor cable 92 is electrically connected to the transmission rings correspondingly. Each adjoining pair of transmission rings are separated from one another by an insulation ring 93 to ensure each of the transmission rings can transmit signals independently. The transmission rings of the column-shaped connector 93 mounted on the connector 90 comprises power transmission rings 911 such as USB 5V, a pair of data transmission ring 912 such as D− and D+channels, and a ground pin 913, i.e. GND. When the column-shaped connector 93 is electrically connected to the earphone transmission port 40 of the preferred embodiment of the present invention to transmit signals, the power ring 911 is electrically connected to the power input pin 411 of the earphone transmission port 40 for transmitting a power signal to the portable media player 1. Meanwhile, the two data transmission rings 912 are electrically connected to the first and second transmission pins 412,413 of the earphone transmission port 40 respectively for transmitting signals between the portable media player 1 and an external device (for example, the host device 95 as shown in FIG. 4) via the signal adaptor cable 92. Furthermore, the ground pin 913 is electrically connected to a ground pin 415 of the earphone transmission port 40 of the portable media player 1.

As described above, a USB connector, an earphone connector, and a recording connector mounted on a traditional MP3 player may be integrated into the common earphone transmission port 40 according to the present invention while the portable media player 1 having an earphone transmission port 40 may be provided with the detection circuit 20 and the switch circuit 30 to provided functions of detection and switch so that the portable media player 1 can be used to transmit signals to any type of device which may have a USB connector, an earphone connector, or a microphone connector for reducing the numbers of traditional transmission ports on the portable media player 1. Moreover, the signal adaptor cable 92 according to another preferred embodiment of the present invention can be used to solve related problems of the traditional USB connector, which has a specification unsuitable for electrically connecting with the earphone transmission port 40 of the present invention.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A portable media player, comprising:

an earphone transmission port connecting to an external connector for receiving a signal or power transmitted from the external connector, which comprises a transmission circuit comprising:

a power input pin connecting to a power transmission ring of the external connector;

a first transmission pin connecting to a first data transmission ring of the external connector;

a second transmission pin connecting to a second data transmission ring of the external connector; and a ground pin connecting to a ground pin of the portable media player and a ground port of the external connector respectively;

a detection circuit connecting to the power input pin of the transmission circuit for detecting a type of the external connector according to the signal or power transmitted from the external connector, and then sending an informing signal representing the type of the external connector;

a switch circuit connecting to the earphone transmission port for switching the earphone transmission port between a signal inputting status for allowing signal transmission through the earphone transmission port into the portable media player and a signal outputting status for allowing signal transmission out of the portable media player through the earphone transmission port;

a processor connecting to the detection circuit and the switch circuit respectively for receiving the informing signal sent from the detection circuit to turn on or off the switch circuit;

an input unit connecting to the processor for transmitting a command signal to the processor to switch the portable media player between the signal inputting status and the signal outputting status;

a power unit connecting to the processor for supplying power to the portable media player;

a storage unit connecting to the processor for storing information processed by and from the processor; and a radio-wave receiver connecting to the processor and the first transmission pin and the second transmission pin of the transmission circuit for receiving an external radio-wave signal from the earphone transmission port, wherein a ground pin of the radio-wave receiver is connected to the ground pin of the transmission circuit, and the ground pin of the transmission circuit then serves as an antenna of the radio-wave receiver and, thereby the processor is able to process the external radio-wave signal and then output the external radio-wave signal out through the earphone transmission port.

2. The portable media player as claimed in claim 1, wherein the processor is capable of processing the radio-wave signal and then storing the radio-wave signal in the storage unit.

3. The portable media player as claimed in claim 1, wherein the processor is capable of processing the information received from the earphone transmission port and then outputting the information through the earphone transmission port.

4. The portable media player as claimed in claim 1, wherein said transmission circuit further comprises:

a third transmission pin connecting to the switch circuit and the first transmission pin respectively for receiving the radio-wave signal from the radio-wave receiver; and a fourth transmission pin connecting to the switch circuit and the second transmission pin respectively for receiving the radio-wave signal from the radio-wave receiver.

5. The portable media player as claimed in claim 1, wherein said detection circuit comprises:

a first transistor connecting to the power input pin; and a triode connecting to the processor and the first transistor respectively for receiving power transmitted from the external connector through the power input pin and the first transistor.

6. The portable media player as claimed in claim 5, wherein after the connector is connected to the earphone transmission port and the power transmitted from the connector reaches the triode, the detection circuit sends the informing signal to the processor for turning off the switch circuit and switching the earphone transmission port into the signal inputting status.

7. The portable media player as claimed in claim 1, wherein said switch circuit comprises:

a pair of second transistors connected between the first and second transmission pins and the processor, wherein if when the connector is connected to the earphone transmission port and the processor turns off the switch circuit, the processor turns off the pair of second transistors and switches the earphone transmission port into the signal inputting status; and a circuit switch connected to the pair of second transistors and between the first and second transmission pins and the processor, wherein when the processor doesn't receive the informing signal from the detection circuit, the processor receives the command signal to turn on the switch circuit and switches the earphone transmission port into the signal outputting status.

8. The portable media player as claimed in claim 1, wherein said first transmission pin further comprises:

a first data port, connecting to the switch circuit, allowing signal transmission through the first data port into the portable media player; and a second data port, connecting to the switch circuit, allowing signal transmission through the second data port out of the portable media player.

* * * * *

UNITED STATES PATENT AND TRADEMARK OFFICE
CERTIFICATE OF CORRECTION

PATENT NO. : 7,664,560 B2
APPLICATION NO. : 11/511230
DATED : February 16, 2010
INVENTOR(S) : Lai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 724 days.

Signed and Sealed this

Twenty-eighth Day of December, 2010

David J. Kappos
*Director of the United States Patent and Trademark Office*